UNITED STATES PATENT OFFICE.

OSCAR F. FUNK, OF ST. LOUIS, MISSOURI, ASSIGNOR OF ONE-FOURTH TO FRANK J. BOEHM, ONE-FOURTH TO WILLIAM R. SCHNEIDER, AND ONE-FOURTH TO HUGH K. WAGNER, ALL OF ST. LOUIS, MISSOURI.

COMPOSITION FOR SMOOTHING THE ABRASIVE SURFACES OF FABRICS OR SIMILAR ARTICLES.

1,321,518. Specification of Letters Patent. Patented Nov. 11, 1919.

No Drawing. Application filed October 7, 1918. Serial No. 257,150.

*To all whom it may concern:*

Be it known that I, OSCAR F. FUNK, a citizen of the United States, residing at the city of St. Louis and State of Missouri, have invented certain new and useful Improvements in Compositions for Smoothing the Abrasive Surfaces of Fabrics or Similar Articles, of which the following is a specification.

This invention consists of a composition of matter for smoothing the edges of linen collars or the like. Those now customarily worn by men around the neck are more particularly in contemplation. These, it is well known, abrade the underlying shirt and wear a hole therein below the neckband. This hole becomes worn long before the shirt elsewhere is worn out and makes it necessary to discard an otherwise good shirt. Furthermore the edge of the collar that is at its top rubs and abrades the neck of the wearer, producing discomfort, soreness, and other ills.

The substance hereinafter described is adapted, when rubbed upon the edge or edges of a collar, to prevent both forms of abrasion hereinabove mentioned by imparting to the edge of the collar a smooth finish surpassing the gloss of starch or the like.

For convenience of commercial handling the same will preferably be formed in small cakes susceptible of neat and cheap individual packing, enabling its sale like a cake of soap. Because this substance is quite hard, a small cake thereof will last a long time. It is preferably perfumed in an agreeable manner like other toilet articles.

This compound is preferably composed of pulverized talc, an example of which is steatite, amorphous calcium sulfate, an example of which is plaster of Paris, and an ingredient such as Chinese insect wax, beeswax, paraffin, Japan wax, carnauba wax, montan wax. In lieu of any one of the ingredients or waxes mentioned in the last clause, I may employ the combination of any two or more of them.

Classifying the foregoing ingredients, let the pulverized talc be designated as A; the calcium sulfate as B; and, the other ingredient or ingredients as C. Then in the composition the ingredient known as A will range from 30% to 60% of the whole; the B ingredient will range from 45% to 15% of the whole; and the C ingredient or ingredients will be 25% of the whole. All these percentages are given by weight. In case any two or more of the ingredients within the C class are combined, then their total percentage in the combination will be 25% of the whole.

It is to be understood, of course, that in each of the three classes the article named is only the preferred ingredient and that the usual range of equivalents is within the scope of this invention. By experiment it has been ascertained that any one of the ingredients specifically named in the C class will answer the desired purpose, but they are preferred in the order named.

It will be readily understood that as the percentage of pulverized talc increases, that of the calcium sulfate must be decreased, and vice versa, and that this invention is not to be confined to the precise percentage of 25% for the ingredient or ingredients in class C. The relative quantities of the ingredients will be determined to a considerable extent by the degree of hardness, brittleness, smoothness, or other quality that is necessary to satisfy particular commercial demands or the desires of users.

In the preparation of this article the ingredient or ingredients in class C will be heated to 120 degrees centigrade. The pulverized talc and amorphous calcium sulfate must be thoroughly mixed. Then this mixture is slowly added to the heated class C ingredient, the temperature thereof being either maintained at 120 degrees centigrade or raised toward or to 150 degrees centigrade, and during this operation the whole is thoroughly mixed until a homogeneous mass is obtained. Any suitable perfume can be introduced in any desired amount.

Air pockets in the said mass should be eliminated by percussion or compression, and then the mass is poured into a suitable mold and cooled under pressure. The degree of hardness of the resultant cake or tablet is, to a certain extent, dependent upon the amount of pressure applied.

I claim:

1. A composition for smoothing the abrasive surfaces of fabrics or the like, comprising talc, amorphous calcium sulfate, and a waxy material, such ingredients being thoroughly mixed for producing a homogeneous mass.

2. A composition for smoothing the abrasive surfaces of fabrics or the like, comprising from 30 to 60 per cent. by weight of finely divided talc, 15 to 45 per cent. by weight of finely divided amorphous calcium sulfate, and approximately 25 per cent. by weight of a wax, such ingredients being thoroughly mixed to produce a homogeneous mass.

3. The herein described process, which consists in heating a wax to approximately 120° F. to 150° F. to render the same molten, and thoroughly mixing finely divided talc and amorphous calcium sulfate and introducing this mixture into the molten wax and thoroughly agitating the mass and allowing the same to cool.

In testimony whereof I hereunto affix my signature.

OSCAR F. FUNK.